United States Patent
Raibel et al.

(10) Patent No.: US 12,044,160 B2
(45) Date of Patent: Jul. 23, 2024

(54) PRE-CHAMBER FOR AN INTERNAL COMBUSTION ENGINE AND COMBUSTION ENGINE

(71) Applicant: INNIO Jenbacher GmbH & Co OG, Jenbach (AT)

(72) Inventors: Matthias Raibel, Innsbruck (AT); Jochen Fuchs, Wattens (AT); Robert Boewing, Innsbruck (AT); Andreas Birgel, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/020,425

(22) PCT Filed: Aug. 28, 2020

(86) PCT No.: PCT/AT2020/060323
§ 371 (c)(1),
(2) Date: Feb. 9, 2023

(87) PCT Pub. No.: WO2022/040705
PCT Pub. Date: Mar. 3, 2022

(65) Prior Publication Data
US 2024/0035412 A1    Feb. 1, 2024

(51) Int. Cl.
*F02B 19/10* (2006.01)
*F02B 19/12* (2006.01)

(52) U.S. Cl.
CPC ...... *F02B 19/1014* (2013.01); *F02B 19/1023* (2013.01); *F02B 19/12* (2013.01)

(58) Field of Classification Search
CPC ... F02B 19/1014; F02B 19/1023; F02B 19/12
(Continued)

(56) References Cited

U.S. PATENT DOCUMENTS

| | | |
|---|---|---|
| 4,095,565 A | 6/1978 | Noguchi et al. |
| 10,323,566 B2 | 6/2019 | Fuchs |

(Continued)

FOREIGN PATENT DOCUMENTS

| | | | |
|---|---|---|---|
| DE | 102009037160 A1 * | 6/2011 | .......... F02B 19/1028 |
| DE | 102016012319 A1 | 4/2018 | |

(Continued)

OTHER PUBLICATIONS

DE-102009037160-A1 (Herdin R) (Jun. 22, 2011) (Machine Translation) (Year: 2011).*

(Continued)

*Primary Examiner* — Mahmoud Gimie
(74) *Attorney, Agent, or Firm* — Fletcher Yoder, P.C.

(57) ABSTRACT

A pre-chamber component for an internal combustion engine includes a chamber for accommodating an air-fuel-mixture to be ignited, wherein the pre-chamber component includes a first opening into the chamber for arranging an ignition device, in particular a spark plug, and a second opening for introducing the air-fuel-mixture in the form of a mixture flow into the chamber. The pre-chamber component includes a mixture flow guiding device, which is shaped such that the mixture flow of the air-fuel-mixture in the chamber is oriented substantially transversely with respect to a longitudinal axis from the second opening of the chamber to at least a part of the chamber adjacent to the first opening and/or in the form of a turbulent flow.

22 Claims, 3 Drawing Sheets

(58) Field of Classification Search
USPC .......................................................... 123/274
See application file for complete search history.

(56) References Cited

U.S. PATENT DOCUMENTS

| | | |
|---|---|---|
| 2016/0273443 A1 | 9/2016 | Chiera et al. |
| 2022/0120210 A1 | 4/2022 | Puschnik et al. |

FOREIGN PATENT DOCUMENTS

| | | | |
|---|---|---|---|
| DE | 102018206625 A1 | 10/2019 | |
| EP | 2735717 A2 | 5/2014 | |
| EP | 3012444 A1 * | 4/2016 | .......... F02B 19/1004 |
| EP | 3061939 A1 | 8/2016 | |
| EP | 3303804 A1 | 4/2018 | |
| JP | S63162922 A | 7/1988 | |
| JP | 2009221936 A | 10/2009 | |
| WO | 2020150759 A1 | 7/2020 | |

OTHER PUBLICATIONS

PCT International Search Report and Written Opinion; Application No. PCT/AT2020/060323; dated May 26, 2021; 10 pages.

\* cited by examiner

PRE-CHAMBER FOR AN INTERNAL COMBUSTION ENGINE AND COMBUSTION ENGINE

CROSS-REFERENCE TO RELATED APPLICATION

This application is a National Stage entry from, and claims benefit of, PCT Application No. PCT/AT2020/060323, filed on Aug. 28, 2020; entitled "PRE-CHAMBER FOR AN INTERNAL COMBUSTION ENGINE AND COMBUSTION ENGINE", which is herein incorporated by reference in its entirety.

BACKGROUND

The present invention concerns a pre-chamber component for an internal combustion engine.

Pre-chambers are commonly used for improving the ignition performance of large engines, in particular large gas engines, which are operated with a lean burn concept. Burning a very lean mixture of air and fuel makes it possible to reduce unwanted emissions, like NOx. The downside is that the ignition performance suffers as the lean mixture of air and fuel exhibits a much lower tendency for controlled ignition compared to stoichiometric mixtures of air and fuel.

Pre-chambers solve this problem by providing a separate volume in which ignition can be performed reliably and by guiding resulting flame jets into the main combustion chamber. Usually, a lower air to fuel ratio (i.e., lower lambda) compared to the main combustion chamber is used to improve the ignition in the pre-chamber.

In order to reach this lower air to fuel ratio, either only fuel or an air-fuel-mixture is delivered to the pre-chamber, while non-combustible gases left over from the previous combustion cycle are flushed out. The present invention is concerned with pre-chambers which are supplied with an air-fuel-mixture, so-called mixture scavenged pre-chambers.

Such pre-chamber components comprise a chamber (also known as the pre-chamber) for accommodating an air-fuel-mixture to be ignited, wherein
a first opening into the chamber for arranging an ignition device, in particular a spark plug, is provided, and
a second opening for introducing the air-fuel-mixture in the form of a mixture flow into the chamber is provided.

Usually, the longitudinal axis of the chamber and an orientation of a conduit for supplying the air-fuel-mixture to the chamber are chosen to be parallel, in order to save space in the cylinder head, where also other important structures are situated. However, the result is that the mixture flow enters the chamber in the same surface of the chamber where the ignition device is arranged (i.e., the second opening). Therefore, at least initially, the direction of the mixture flow faces away from the ignition device, which is obviously detrimental to the ignition performance in the chamber as the mixture flow needs sufficient time to actually reach the vicinity of the ignition device.

The prior art knows of other embodiments where the orientation of the chamber and the orientation of the conduit delivering the air-fuel-mixture to the chamber are at a relatively large angle. In this respect, reference is made to U.S. Pat. No. 4,095,565, which discloses a pre-chamber which is supplied with an air-fuel-mixture of a lower air to fuel ratio than which is used in the main combustion chamber. The pre-chamber disclosed in U.S. Pat. No. 4,095,565 has a second opening for introducing the air-fuel-mixture and a further opening for fluid communication with the main combustion chamber, which are both arranged at a distal end (in reference to the first opening in which the spark plug is arranged). As mentioned, the chamber in this prior art document is arranged obliquely with respect to the conduit providing the air-fuel-mixture (and also obliquely with respect to the movement axis of the piston).

This has the first disadvantage that the air-fuel-mixture also has to reverse the direction of travel during ignition in order to reach the main combustion chamber (then in the form of a flame jet), i.e., the flow resistance the air-fuel-mixture/flame jets experience is relatively high limiting the speed at which flame jets entering the main combustion chamber can be created.

Secondly, judging from the shape of the pre-chamber in U.S. Pat. No. 4,095,565, the flow of the air-fuel-mixture into the pre-chamber is laminar. Optimally, the flow of the air-fuel-mixture at least in a substantial part of the chamber should be turbulent, because a turbulent flow promotes a fast and thorough burning of the air-fuel-mixture right after ignition. It is clear, that a fast and thorough burning of the air-fuel-mixture in the pre-chamber is a desirable quality given the purpose of the pre-chamber of improving the ignition performance of the engine.

BRIEF DESCRIPTION

The object of certain embodiments of the invention is to provide a pre-chamber component, which allows for a faster and/or more thorough combustion of the air-fuel mixture in the pre-chamber.

In certain embodiments, this object is achieved with a mixture flow guiding device, which is shaped such, that the mixture flow of the air-fuel-mixture in the chamber is:
oriented substantially transversely with respect to a longitudinal axis from the second opening of the chamber to at least a part of the chamber adjacent to the first opening, and/or
in the form of a turbulent flow.

It is an important aspect of certain embodiments of the invention that a mixture flow guiding device can advantageously be used to create a mixture flow to the vicinity of the second opening, which is substantially unobstructed, and which therefore supports a short and fast travel time of the air-fuel-mixture to the area of the chamber where the ignition takes place (i.e., the vicinity of the second opening where the ignition device is to be arranged).

Another important aspect, in accordance with certain embodiments, is that the mixture flow guiding device can create a turbulent flow at least in a part of the chamber, which helps to promote fast and thorough burning of the air-fuel-mixture as soon as it has been ignited.

Additionally, a turbulent flow region or component in the pre-chamber, according to certain embodiments of the invention, has the advantage that a proper scavenging of the pre-chamber can be ensured. It is a known problem, in certain internal combustion engines, that the pre-chamber is not properly scavenged, even though there is an appropriate pressure difference between the main combustion chamber and the supply conduit for providing the air-fuel-mixture through the second opening.

The problem is that the mentioned pressure difference in fact induces the mixture flow, but since the flow properties in the pre-chamber are essentially laminar, the mixture flow flows past the gas component remaining in the pre-chamber from the previous combustion cycle without actually flushing the pre-chamber properly (German:

"Kurzschlussspülung"). Therefore, a turbulent mixture flow in the pre-chamber not only improves the combustion, but also ensures proper scavenging of the pre-chamber during the exchange phases of the combustion cycle.

In particularly preferred embodiments, the mixture flow impinging onto the ignition device is both transverse with respect to a longitudinal axis from the second opening of the chamber to at least a part of the pre-chamber adjacent to the first opening and turbulent in nature. Such embodiments optimize the advantages of the invention mentioned before (faster burning, more thorough burning of the air-fuel-mixture in the pre-chamber).

In such embodiments (both transverse and turbulent mixture flow), the mixture flow guiding device can preferably induce a mixture flow, which:

transversely reaches the (vicinity of the) first opening/the ignition device in a substantially laminar way, and in a separate portion of the chamber is turbulent in nature.

In such embodiments, the positive effects of the air-fuel-mixture reaching the ignition device quickly (because of the transverse mixture flow) and of a fast and thorough burning of the air-fuel-mixture right after said ignition (because of the turbulent mixture flow) can be maximized.

The part of the chamber adjacent to the first opening is a vicinity of the first opening, i.e., where the ignition device is to be arranged. This part of the chamber can be understood to be the vicinity of the ignition device where the energy is introduced by the ignition device for igniting the air-fuel-mixture.

Usually, the longitudinal axis of the chamber will be an axis along which the ignited air-fuel-mixture travels to reach the main combustion chamber. Other embodiments, where the longitudinal axis is, e.g., perpendicular or oblique with respect to this direction of travel, are in principle conceivable.

The longitudinal axis is to be understood as the longitudinal axis of the chamber in a geometric sense. For example, the longitudinal axis can be an axis along which the chamber has a biggest length.

A direction transverse to the longitudinal axis can be understood to include any direction not substantially parallel to the longitudinal axis, i.e., with at least a substantial direction component oblique or perpendicular with respect to the longitudinal axis. In more preferred embodiments, the angle between the transverse direction and the longitudinal direction can substantially be a right angle. It should however be noted, that also in these embodiments, the longitudinal axis and the transverse direction do not need to intersect. In these cases the mentioned substantial right angle will therefore only appear in a side view onto the longitudinal axis.

However, a transverse direction of the mixture flow intersecting the longitudinal axis is of course also conceivable according to certain embodiments of the invention.

The term "substantially transversely" is used to express that the transverse mixture flow does, for example, not have to be exactly at a right angle to the longitudinal axis of the chamber. The effect of certain embodiments of the invention can, of course, also be achieved if there is a slight deviation of the exact transverse direction in comparison to the longitudinal axis. Depending on the particular embodiment, the effect of the invention can still be achieved, if a deviation from the exact transverse direction is less than 40°, less than 30°, less than 20° or less than 10°.

Similar characterizations can also be used for other occurrences of the term "substantially" in this document.

As already mentioned, the ignition device according to certain embodiments of the invention can be a spark plug. Another example for an ignition device would be a laser ignition device (also called "laser spark plugs"), which introduces the necessary ignition energy by way of a laser instead of an electrical spark.

The pre-chamber component, according to certain embodiments of the invention, can be a single (monolithic) component or can comprise several different component parts, which together form the pre-chamber component according to certain embodiments of the invention.

Protection is also sought for an internal combustion engine comprising a pre-chamber component according to certain embodiments of the invention. The embodiments of the invention can be used in one, more and/or all of the pre-chamber components used in an internal combustion engine.

The embodiments of the invention can particularly advantageously be used together with reciprocating piston engines, in particular gas engines, preferably stationary gas engines or gas engines for naval applications. The embodiments of the invention can in this case be realized on one, more and/or all of the cylinders of the reciprocating piston engine, the cylinders being the main combustion chambers in a reciprocating piston engine.

The embodiments of the invention can be used in internal combustion engines, in particular gas engines, which drive a generator for creating electrical energy. Such combinations of a gas engine driving a generator are called gensets.

All features and functions described with respect to the prior art can also be used together with certain embodiments of the invention.

The scavenging of the pre-chamber may usually take place during an intake and/or an exhaust stroke.

In preferred embodiments, the pre-chamber component, according to certain embodiments of the invention, can—particularly preferably in conjunction with the internal combustion engine—be equipped so that the complete volume of the chamber is scavenged by the air-fuel-mixture. Even more preferably, the chamber is scavenged/flushed with a volume of air-fuel-mixture which is twice the volume of the chamber.

As already mentioned, the chamber of the pre-chamber component according to certain embodiments of the invention is also called pre-chamber.

Further advantageous embodiments are defined in the dependent claims.

The mixture flow guiding device can comprise a first guiding wall, which is substantially parallel to a surface of the chamber in which the first opening for arranging the ignition device is located. Formulated differently, the mixture guiding device can comprise a first guiding wall which is opposite the first opening in which the ignition device can be arranged or substantially coincide with the same. Such a wall can be particularly effective in guiding the mixture flow to impinge on the ignition device when the ignition device is arranged in the first opening.

The mixture flow guiding device can comprise a second guiding wall, which is substantially aligned in parallel with the longitudinal axis. The second guiding wall can in addition have a cylindrical profile with the longitudinal axis of the chamber being the axis of the cylindrical profile. Also, in this case, the second guiding wall is understood to be aligned in parallel with the longitudinal axis.

The first guiding wall and/or the second guiding wall and/or potentially further guiding walls and/or deflection surfaces can be used to adjust the mixture flow in the chamber.

For an easy manufacturing process, the first guiding wall and/or the second guiding wall can be manufactured as flat surfaces and/or as cylindrical surfaces with an edge as transition between the first guiding wall and the second guiding wall.

Alternatively, in principle, also a rounded transition can be provided between the first guiding wall and the second guiding wall. Such a rounded transition can ensure that there is no undue flow resistance for the mixture flow guided by the mixture flow guiding device.

The mixture flow guiding device can comprise a flow break-away edge for creating the turbulent mixture flow. Flow break-away edges are known in and of themselves in the prior art. This general concept can be used advantageously in context of certain embodiments of the present invention for creating the turbulent flow properties of the mixture flow according to certain embodiments of the invention.

Flow break-away edges allow for good control of regions of macroscopic turbulence and microscopic turbulence. Macroscopic turbulence is distinguished from microscopic turbulence through the scale of the vortices and other turbulent flows properties. For macroscopic turbulence, the size of turbulent flow characteristics are large enough to be measured, while for microscopic turbulence this is not possible or only in a very limited manner.

Figure 1:
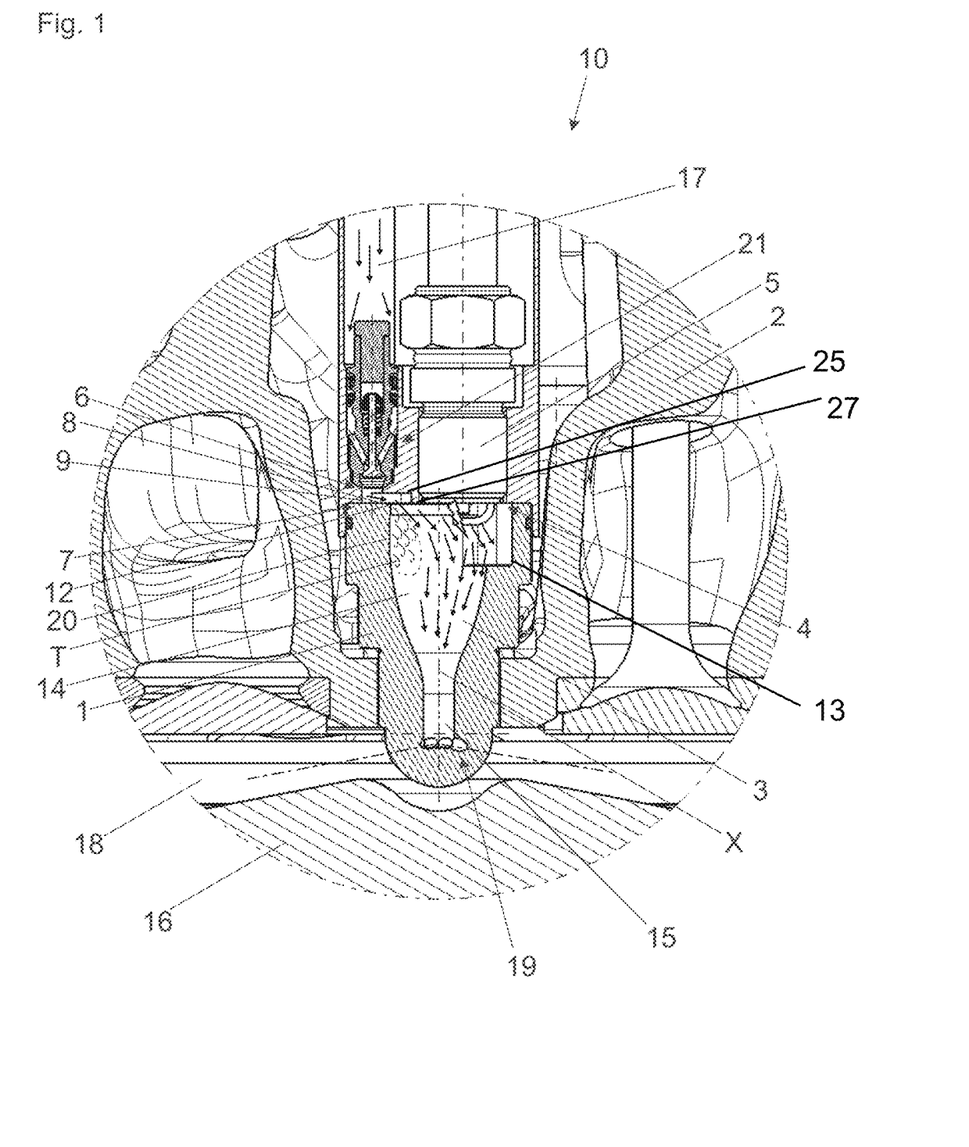
FIG. 1 is a cross-sectional view of an embodiment of a pre-chamber component according to certain embodiments of the invention.

A flow break-away edge can create a defined area of macroscopic turbulent flow (at least before combustion) in the sense that there can be a good control on the dividing surface between turbulent and laminar flow (see, e.g., FIG. 1).

If should be noted that macroscopic turbulence, which is generated, e.g., by a break-away edge, will result in a higher amount of microscopic turbulence during combustion. This is quite beneficial as a larger amount of microscopic turbulence promotes mixing of the different components of the combusting air-fuel-mixture and consequently also promotes a fast and thorough combustion in the pre-chamber, i.e., the positive effect of the invention is even improved in embodiments with a flow break away edge.

A further advantage of the flow break-away edge and the defined region of macroscopic turbulence which can be achieved with it, is that the remaining laminar part of the mixture flow—which is preferably oriented substantially transversely with respect to a longitudinal axis from the second opening of the chamber to at least a part of the pre-chamber adjacent to the first opening according to the invention—can be pushed towards the ignition device. In other words, the flow break-away edge can be used to create a desired (macroscopically) turbulent flow, while at the same time directing a laminar part of the flow in a desired direction (i.e., onto the ignition device.

The mixture flow guiding device with the flow break-away edge can be adapted to lead the mixture flow substantially transversely over the flow break away edge in order to create as much turbulence as possible when the mixture flow breaks away at the flow break-away edge.

The first guiding wall and/or the flow break-away edge can be disposed on a peripheral wall (in relation to the longitudinal axis, i.e., a "side wall") of the chamber or at a greater distance from the first opening than an adjacent section of the peripheral wall. Such an arrangement can avoid obstructions inside the chamber, which would hinder the flow of the air-fuel-mixture or the ignited air-fuel-mixture.

Alternatively, the first guiding wall and/or the flow break-away edge can be disposed on a protrusion into the chamber. A protrusion into the chamber makes it possible to bring the first guiding wall and/or the flow break-away edge closer to the first opening for arranging the ignition device with the entailing positive effects on the effectiveness of the mixture flow guiding device. A potential disadvantage of such a protrusion into the chamber can be an increased flow resistance in the chamber along the longitudinal axis, which however may be reduced with a rounded shape of the protrusion on the side facing away from the ignition device.

The mixture flow guiding device can be shaped such that the transverse mixture flow impinges onto the ignition device when the ignition device is arranged in the first opening, in particular impinges on the part of the ignition device which is disposed in the first opening of the chamber or inside the chamber. (Such components of the ignition device can for example be electrodes of a spark plug.) This can optimize the effect of a quicker and more thorough combustion of the air-fuel-mixture in the chamber according to certain embodiments of the invention.

The impinging on the ignition device means that the mixture flow guided by the mixture flow guiding device reaches the (close) vicinity of the ignition device directly and there creates the conditions for a fast ignition according to certain embodiments of the invention.

The guiding of the mixture flow transversely with respect to the longitudinal axis according to certain embodiments of the invention can also be realized by adequately positioning the second opening for introducing the air-fuel-mixture into the chamber. In this case, the mixture flow guiding device comprises the second opening which faces transversely with respect to the longitudinal axis. Further geometrical features for adjusting the guiding direction and/or creating the turbulent flow can of course be present.

Viewed in a section along the longitudinal axis, the chamber can have a first wider part and a second narrower part, wherein the first opening and the second opening are arranged in the first part.

The second narrower part can in this case realize a channel for the ignited and expanding air-fuel-mixture from the first wider part of the chamber towards the main combustion chamber on the one hand and for gases being transferred from the main combustion chamber into the pre-chamber component during a compression stroke. In the latter case, the second narrower part of the chamber may have the effect of a buffer volume such that the gases from the main combustion chamber do not immediately reach the wider first part of the chamber where the ignition of the air-fuel-mixture takes place. Potentially detrimental effects of the gases from the main combustion chamber on the ignition can be reduced or avoided in this way.

The chamber and a main combustion chamber can be in fluid communication via a plurality of transfer passages extending through the pre-chamber component.

In a particularly preferred embodiment, the plurality of transfer passages fluidly connect the main combustion chamber with the second narrower part of the chamber in the pre-chamber component.

The transfer passages can have a smaller cross-section compared to the second narrower part of the chamber. In such an embodiment, the air-fuel-mixture ignited in the first wider part of the chamber is guided by successively narrower channels (first wider part, second narrower part, transfer passages with smaller cross-section compared to the second narrower part) into the main combustion chamber. This results in fast directed flame jets extending from the transfer passages deep into the respective main combustion chamber, which results in a thorough ignition of the mixture of fuel and air present in the main combustion chamber. Even cylinders of a very large capacity filled with a lean mixture of air and fuel can in such a way be fired effectively.

It is noteworthy, that during the compression stroke, transfer passages also allow for some of the fluid content of the main combustion chamber to enter the pre-chamber. According to certain embodiments of the invention however, independently of the fluid connection created by the transfer passages, the mixture flow of the air-fuel-mixture—introduced separately from the transfer passages, e.g., by a separate supply conduit—into the chamber is oriented substantially transversely with respect to a longitudinal axis from the second opening of the chamber to at least a part of the pre-chamber adjacent to the first opening and/or the mixture flow is a turbulent flow.

The flow guiding device may comprise a recess which is arranged in the peripheral wall of the (pre-) chamber, wherein the second opening according to certain embodiments of the invention is disposed inside the recess. In this way, the mixture flow entering the chamber through the second opening is forced in the direction of an open face of the recess, which is preferably oriented towards the part of the chamber adjacent to the first opening.

The ignition device can be arranged in the first opening and a device axis of the ignition device is preferably parallel to the longitudinal axis of the chamber.

The internal combustion engine can comprise a reciprocating piston and the longitudinal axis of the chamber can preferably be parallel to a moving axis of the piston.

A supply conduit for delivering the air-fuel-mixture to the chamber through the second opening can substantially be aligned in parallel to the longitudinal axis of the chamber.

Aligning the device axis of the ignition device and/or the moving axis of the piston and/or the supply conduit for delivering the air-fuel-mixture to the chamber can make a very compact cylinder arrangement possible.

In preferred embodiments, a (passive) check valve or a controlled valve can be arranged in the supply conduit, particularly preferably in close proximity or adjacent to the second opening in order to minimize a "dead volume" of the supply conduit in constant fluid communication with the chamber. The controlled valve can be controlled in open loop or closed loop fashion.

The pre-chamber component, according to certain embodiments of the invention, can be mounted into a cylinder head of a respective cylinder.

In particularly preferred embodiments, the air-fuel-mixtures introduced into the pre-chamber and the main combustion chamber are taken from the same source, e.g., an intake manifold or an intake port of the internal combustion engine. That is, the air-fuel-mixture for the pre-chamber is "the same" as the one for the main combustion chamber. Separate devices for preparing and pressurizing (e.g., using a compressor) the air-fuel-mixture for the pre-chamber can be avoided in this way.

BRIEF DESCRIPTION OF THE DRAWINGS

Further details and advantages are apparent from the figures and the accompanying description of the figures, which show.

DETAILED DESCRIPTION

Figure 2:
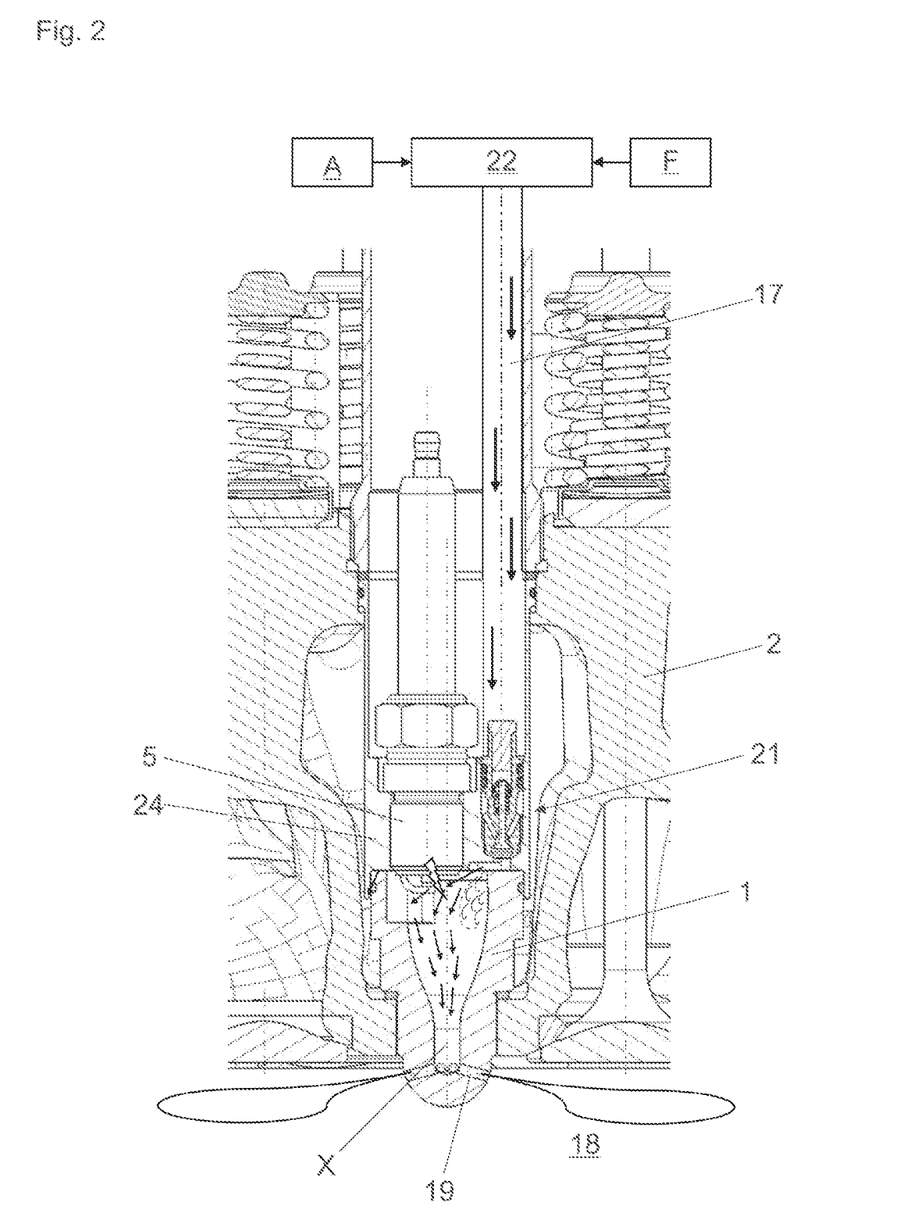
FIG. 2 is the embodiment of FIG. 1 in a broader view mounted inside the cylinder head.

FIG. 1 and FIG. 2 depict a cross-sectional view of the pre-chamber component 1, according to certain embodiments of the invention, as part of an internal combustion engine Surrounding components, like the cylinder head 2 and the piston 16, are partly shown as well.

The pre-chamber component 1 is part of an ignition assembly shown in FIG. 2 also comprising the ignition device 5 (in this case a spark plug) and the supply conduit 17 for delivering the air-fuel-mixture to the pre-chamber component 1.

Only schematically indicated are a supply A for air and a reservoir F for fuel as well as a mixture device 22 for providing the air-fuel mixture. The mixture device 22 can for example be realized as a conduit for air and a fuel injector for injecting fuel, or a mixing device for mixing the fuel with the air.

The basic functionality of a mixture scavenged pre-chamber is that:

the air-fuel-mixture is supplied (via the supply conduit 17 and the valve 21) to the chamber 3 of the pre-chamber component 1, the air-fuel-mixture in the chamber 3 is ignited by the ignition device 5 (arranged in the first opening 4), the combusting air-fuel-mixture expands through the chamber 3 (in the depiction of FIG. 1 downwards) through the transfer passages 19, and because of the shape of the transfer passages 19, the combusting air-fuel-mixture forms flame jets (as indicated in FIG. 2) expanding into the main combustion chamber 18 effectively igniting the mixture of air and fuel in the main combustion chamber 18.

It should be mentioned that the transfer passages 19 do not show up in full length in the sectional view of FIG. 1, as they are oriented in various directions and as such only partly intersect the view of FIG. 1.

In this embodiment, the internal combustion engine 10 shown in FIG. 1 is of a reciprocating piston configuration, such that the main combustion chamber 18 is formed by a crank case (or a cylinder liner), a reciprocating piston 16, and a cylinder head 2, which together form the cylinder.

Of course, other components like the pre-chamber component 1 according to certain embodiments of the invention, valves and the like can also be arranged in the cylinder.

The mixture flow reaches the chamber 3 through the second opening 6, where also the mixture flow guiding device 7 is arranged.

The mixture flow guiding device 7 comprises a first guiding wall 8 and a second guiding wall 9. The first guiding wall 8 faces the surface (e.g., bottom wall 27 of spark plug sleeve 24) of the chamber 3 in which the first opening 4 and the ignition device 5 are arranged. The second guiding wall 9 is parallel to the portion of the peripheral wall 20 of the chamber 3, but at a greater distance from the longitudinal axis X (or the first opening 4).

The first guiding wall 8 and the second guiding wall 9 together turn the mixture flow entering through the second opening 6 as a flow parallel to the longitudinal axis X of the chamber 3 by about 90°, so that the mixture flow transversely crosses the chamber 3 to reach the ignition device 5 in an essentially laminar manner.

The peripheral wall 20 and the first guiding wall 8 form a flow break-away edge 12 for creating the turbulent mixture flow. As indicated by the area of the chamber with reference T, the portion of the chamber 3 in which a (macroscopic) turbulent flow will be prevalent is quite well defined—at least before ignition takes place.

Therefore, according to certain embodiments of the invention, the pre-chamber component 1 comprises the mixture flow guiding device 7 for creating both a transverse and turbulent mixture flow, where the transverse mixture flow reaches the (vicinity of the) first opening 4/the ignition device 5 in a substantially laminar way and in a separate portion T of the chamber is turbulent in nature. Therefore, on the one hand, the air-fuel-mixture reaches the ignition device 5 quickly resulting in a fast ignition of the air-fuel-mixture, and, on the other hand, the turbulence present in the chamber 3 will support a fast and thorough burning of the air-fuel-mixture once ignited.

It should be mentioned that the visualization of the portion T, where turbulent flow is prevalent, is only to be understood as a very specific example at a very specific time during the combustion cycle. Especially after ignition, the flow inside most of the chamber 3 will be turbulent on microscopic and macroscopic levels, and the ignited air-fuel-mixture will expand rapidly towards the main combustion chamber 18.

The basic idea of certain embodiments of the invention of creating a "transversally" and turbulently scavenged pre-chamber, therefore, not only improves the ignition performance of a mixture scavenged pre-chamber, but can also be economically implemented in, e.g., a serialized gas engine.

In the cross-sectional view of FIG. 1, along the longitudinal axis X, the chamber 3 has a first wider part 14 and a second narrower part 15, wherein the first opening 4 and the second opening 6 are arranged in the first wider part 14.

The second narrower part 15 realizes a channel for the ignited and expanding air-fuel-mixture from the first wider part 15 of the chamber towards the main combustion chamber 18 on the one hand, and for gases being transferred from the main combustion chamber 18 into the pre-chamber component 1 during a compression stroke. In the latter case, the second narrower part 15 of the chamber 3 has the effect of a buffer volume, such that the gases from the main combustion chamber 18 do not immediately reach the wider first part 14 of the chamber 3, where the ignition of the air-fuel-mixture takes place. Potentially detrimental effects of the gases from the main combustion chamber 18 on the ignition can be reduced or avoided in this way.

The chamber 3, in particular the second narrower part 15 of the chamber 3, and a main combustion chamber 18 are in fluid communication via the plurality of transfer passages 19 extending through the pre-chamber component 1.

The transfer passages 19 have a smaller cross-section compared to the second narrower part 15 of the chamber 3. Accordingly, the air-fuel-mixture ignited in the first wider part 14 of the chamber 3 is guided by successively narrower channels (first wider part 14, second narrower part 15, transfer passages 19 with smaller cross-section compared to the second narrower part 15) into the main combustion chamber 18. This results in fast directed flame jets extending from the transfer passages 19 deep into the main combustion chamber 18, which results in a thorough ignition of the mixture of fuel and air present in the main combustion chamber 18. Even cylinders of a very large capacity filled with a lean mixture of air and fuel can in such a way be fired effectively.

It should be mentioned that the longitudinal axis X of the chamber 3, a device axis of the ignition device 5, and the orientation of the supply conduit 17 are all parallel to each other. A moving axis of the reciprocating piston 16 is also parallel to the longitudinal axis X and, in the particular embodiment of FIG. 1, even coincides with the longitudinal axis X of the chamber 3. The ignition assembly comprising the pre-chamber component 1, the ignition device 5, as well as the supply conduit 17 is therefore very compact above the cylinder, so that other features like inlet valves, exhaust valves and cooling cavities can easily be accommodated in the cylinder head 2.

FIG. 2 shows the embodiment of FIG. 1 in a broader situation within the internal combustion engine 10 and makes clear the geometrically optimized way of integrating the pre-chamber component 1 according to certain embodiments of the invention into an internal combustion engine 10.

Figure 3A:
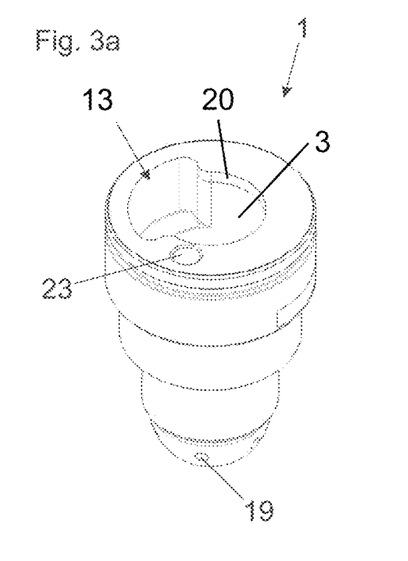
FIGS. 3a-3d illustrate the pre-chamber component and a spark plug sleeve according to certain embodiments of the invention.
Figure 3B:
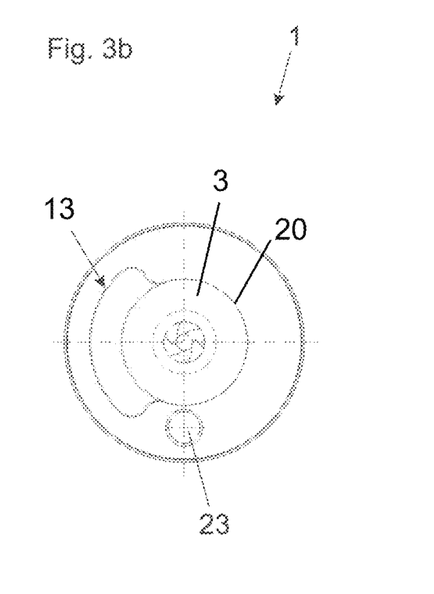

FIGS. 3a and 3b show the pre-chamber component part 1 in a perspective view and a top view, respectively. As can be seen, there is a recess 13 in the peripheral wall 20 of the pre-chamber component part 1 in which the spark plug can arranged (i.e., the recess 13 transitions into the first opening 4 in the spark plug sleeve 24).

Additionally, the pre-chamber component part 1 includes an alignment bore 23 (e.g., alignment feature) for an alignment dowel.

Furthermore, the outlets of the transfer passages 19 are visible in FIG. 3a.

Figure 3C:
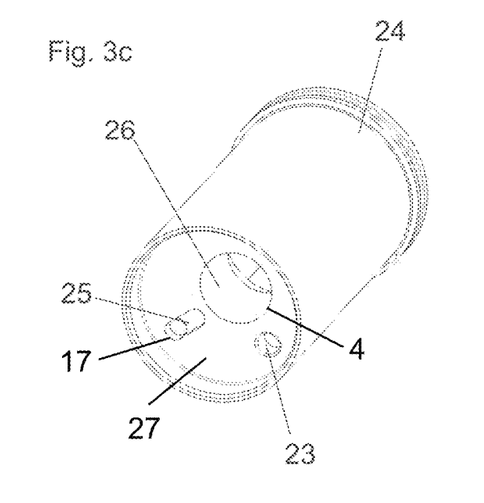
Figure 3D:
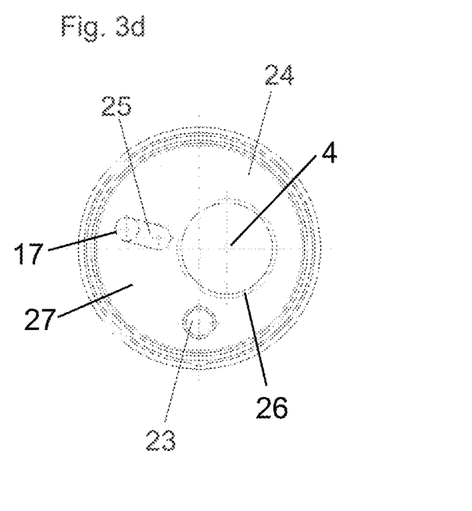

FIGS. 3c and 3d depict an embodiment of a spark plug sleeve 24, which can be used together with a pre-chamber component part 1, according to certain embodiments of the invention. The spark plug sleeve 24 includes an inner surface 26, which can accommodate a thread so that the spark plug can be threaded into the spark plug sleeve 24.

Also, the spark plug sleeve 24 comprises an alignment bore 23 (e.g., alignment feature) in a bottom wall 27, so that the spark plug sleeve 24 can be easily and accurately aligned relative to the pre-chamber component part 1 using an alignment dowel (e.g., mating alignment feature not depicted).

Lastly, the spark plug sleeve 24 comprises the supply conduit 17, including and extending into a slot 25 in the bottom wall 27 of the spark plug sleeve 24 (e.g., axially facing surface defining a top wall of the chamber 3). As shown in the embodiment according to FIGS. 3c and 3d, the supply conduit 17 (e.g., slot 25) can have a slightly inclined arrangement, so as to introduce the air-fuel-mixture into the chamber 3 closer to the ignition device 5 (compared to embodiments where the supply conduit 17 is not inclined).

The invention claimed is:
1. A system, comprising:
a pre-chamber component coupled to a spark-plug sleeve to define a pre-chamber configured to couple to an internal combustion engine, wherein the pre-chamber comprises:
a chamber configured to receive an air-fuel-mixture, wherein the chamber is formed by a peripheral wall of the pre-chamber component extending about a longitudinal axis and a bottom wall of the spark plug sleeve extending across the longitudinal axis;
a first opening into the chamber, wherein the first opening is disposed in the bottom wall, and the first opening is configured to receive an ignition device to ignite the air-fuel mixture;

a second opening into the chamber, wherein the second opening is configured to introduce the air-fuel-mixture as a mixture flow into the chamber;

a mixture flow guide comprising one or more guiding walls in the pre-chamber component and a slot in the bottom wall of the spark plug sleeve, wherein the slot extends along the bottom wall at least from the peripheral wall over a distance toward the first opening, wherein the mixture flow guide is shaped such that the mixture flow of the air-fuel-mixture in the chamber is:

oriented substantially transversely with respect to the longitudinal axis from the second opening of the chamber to at least a part of the chamber adjacent to the first opening.

2. The system of claim 1, wherein the one or more guiding walls of the mixture flow guide comprises a first guiding wall substantially parallel to the bottom wall of the spark plug sleeve having the first opening, and the first guiding wall extends outwardly away from the peripheral wall.

3. The system of claim 2, wherein the one or more guiding walls of the mixture flow guide comprises a second guiding wall substantially aligned in parallel with the longitudinal axis, and the second guiding wall is offset outwardly away from the peripheral wall.

4. The system of claim 3, wherein the mixture flow guide comprises a flow break-away edge configured to create a turbulent mixture flow, and the flow break-way edge is disposed at an intersection of the first guiding wall and the peripheral wall.

5. The system of claim 4, wherein the slot of the mixture flow guide is recessed in the bottom wall of the spark plug sleeve at least from the flow break-away edge inwardly to a position radially offset from the peripheral wall.

6. The system of claim 1, wherein the mixture flow guide is shaped such that the transverse mixture flow impinges onto the ignition device when the ignition device is arranged in the first opening.

7. The system of claim 1, wherein the mixture flow guide comprises the second opening facing transversely with respect to the longitudinal axis.

8. The system of claim 1, wherein, in a section along the longitudinal axis, the chamber has a first wider part and a second narrower part, wherein the first opening and the second opening are arranged in the first wider part.

9. The system of claim 1, comprising the internal combustion engine having the pre-chamber component coupled to the spark-plug sleeve to define the pre-chamber.

10. The system of claim 9, wherein the ignition device is arranged in the first opening and a device axis of the ignition device is parallel to the longitudinal axis of the chamber.

11. The system of claim 10, wherein the internal combustion engine comprises a reciprocating piston, and the longitudinal axis of the chamber is parallel to a moving axis of the piston, wherein a supply conduct configured to deliver the air-fuel-mixture to the chamber through the second opening is substantially aligned in parallel to the longitudinal axis of the chamber, wherein the chamber and a main combustion chamber are in fluid communication via a plurality of transfer passages extending through the pre-chamber component.

12. The system of claim 1, wherein the pre-chamber component comprises a recess in the peripheral wall such that the chamber is asymmetric relative to the longitudinal axis, and the first opening is substantially aligned with the recess.

13. The system of claim 12, wherein the pre-chamber component comprises a first alignment feature, the spark plug sleeve comprises a second alignment feature, and the first and second alignment features are configured to align the recess in the pre-chamber component with the first opening in the spark plug sleeve.

14. A system, comprising:
a mixture flow guide configured to couple to a pre-chamber having a pre-chamber component coupled to a spark plug sleeve of an internal combustion engine, wherein the pre-chamber comprises a chamber formed by a peripheral wall of the pre-chamber component extending about a longitudinal axis and a bottom wall of the spark plug sleeve extending across the longitudinal axis, a first opening disposed in the bottom wall and configured to receive an igniter, and a second opening configured to introduce an air-fuel mixture into the chamber, wherein the mixture flow guide comprises one or more guiding walls in the pre-chamber component and a slot in the bottom wall of the spark plug sleeve, wherein the slot extends along the bottom wall at least from the peripheral wall over a distance toward the first opening, wherein the mixture flow guide is configured to guide the air-fuel mixture into the chamber as a mixture flow:

oriented substantially transversely with respect to the longitudinal axis from the second opening of the chamber to at least a part of the chamber adjacent to the first opening.

15. The system of claim 14, comprising the pre-chamber component, the spark plug sleeve, the internal combustion engine, or a combination thereof, having the mixture flow guide.

16. The system of claim 14, wherein the one or more guiding walls of the mixture flow guide comprises a first guiding wall substantially parallel to the bottom wall of the spark plug sleeve having the first opening, and a second guiding wall substantially aligned in parallel with the longitudinal axis, wherein the first guiding wall extends outwardly away from the peripheral wall, and wherein the second guiding wall is offset outwardly away from the peripheral wall.

17. The system of claim 16, wherein the mixture flow guide comprises a flow break-away edge configured to create a turbulent mixture flow, the flow break-way edge is disposed at an intersection of the first guiding wall and the peripheral wall, and the slot of the mixture flow guide is recessed in the bottom wall at least from the flow break-away edge inwardly to a position radially offset from the peripheral wall.

18. The system of claim 14, wherein the pre-chamber component comprises a recess in the peripheral wall such that the chamber is asymmetric relative to the longitudinal axis, and the first opening is substantially aligned with the recess.

19. The system of claim 18, wherein the pre-chamber component comprises a first alignment feature, the spark plug sleeve comprises a second alignment feature, and the first and second alignment features are configured to align the recess in the pre-chamber component with the first opening in the spark plug sleeve.

20. A method, comprising:
guiding an air-fuel mixture as a mixture flow into a chamber of a pre-chamber having a pre-chamber component coupled to a spark plug sleeve of an internal combustion engine via a mixture flow guide, wherein the chamber is formed by a peripheral wall of the pre-chamber component extending about a longitudinal axis and a bottom wall of the spark plug sleeve extending across the longitudinal axis, the pre-chamber comprises a first opening in the bottom wall of the spark plug sleeve and configured to receive an igniter and a second opening configured to introduce the air-fuel mixture into the chamber, wherein the mixture flow guide comprises one or more guiding walls in the pre-chamber component and a slot in the bottom wall of the spark plug sleeve, wherein the slot extends along the bottom wall at least from the peripheral wall over a distance toward the first opening, wherein the mixture flow guide is configured to guide the mixture flow:
  oriented substantially transversely with respect to the longitudinal axis from the second opening of the chamber to at least a part of the chamber adjacent to the first opening.

21. The method of claim 20, wherein the pre-chamber component comprises a recess in the peripheral wall such that the chamber is asymmetric relative to the longitudinal axis, and the first opening is substantially aligned with the recess.

22. The method of claim 21, wherein the pre-chamber component comprises a first alignment feature, the spark plug sleeve comprises a second alignment feature, and the first and second alignment features are configured to align the recess in the pre-chamber component with the first opening in the spark plug sleeve.

\* \* \* \* \*